(12) United States Patent
Holloway

(10) Patent No.: US 12,507,787 B2
(45) Date of Patent: Dec. 30, 2025

(54) BOTTLE WITH A TRANSPARENT WINDOW

(71) Applicant: Hydration Station, LLC, Fort Lauderdale, FL (US)

(72) Inventor: Jason Holloway, Fort Lauderdale, FL (US)

(*) Notice: Subject to any disclaimer, the term of this patent is extended or adjusted under 35 U.S.C. 154(b) by 70 days.

(21) Appl. No.: 18/597,651

(22) Filed: Mar. 6, 2024

(65) Prior Publication Data

US 2024/0298786 A1    Sep. 12, 2024

Related U.S. Application Data

(60) Provisional application No. 63/450,444, filed on Mar. 7, 2023.

(51) Int. Cl.
*A45F 3/18*       (2006.01)
*B65D 25/54*     (2006.01)

(52) U.S. Cl.
CPC ............. *A45F 3/18* (2013.01); *B65D 25/54* (2013.01)

(58) Field of Classification Search
CPC .................................. A45F 3/18; B65D 25/54
See application file for complete search history.

(56) References Cited

U.S. PATENT DOCUMENTS

| | | | |
|---|---|---|---|
| 10,004,348 B2 | 6/2018 | Sorensen et al. | |
| 10,524,597 B2 | 1/2020 | Sorensen et al. | |
| 11,208,237 B1* | 12/2021 | Hendrickson | B65D 81/18 |
| 11,278,139 B2 | 3/2022 | Sorensen et al. | |
| 11,820,554 B2* | 11/2023 | Whetsel | B65D 25/54 |
| 2007/0158352 A1 | 7/2007 | Cheng | |
| 2017/0225833 A1* | 8/2017 | Ni | B65D 23/12 |
| 2017/0305640 A1 | 10/2017 | Thompson | |
| 2019/0038008 A1* | 2/2019 | Lee | A61L 2/10 |
| 2021/0229865 A1* | 7/2021 | Wang | A45F 3/18 |
| 2022/0232956 A1* | 7/2022 | Ripley | B65D 23/108 |
| 2023/0234769 A1* | 7/2023 | Gimelstein | B01F 33/254 |
| | | | 366/130 |
| 2024/0343545 A1* | 10/2024 | Lyons | B67D 1/0871 |
| 2025/0178819 A1* | 6/2025 | Feibush | G01F 23/02 |

FOREIGN PATENT DOCUMENTS

| | | |
|---|---|---|
| CN | 204091709 U | 1/2015 |
| CN | 213941514 U | 8/2021 |
| EP | 0932357 A1 | 8/1999 |
| KR | 20020091740 A | 12/2002 |
| WO | 2002100321 A1 | 12/2002 |

* cited by examiner

*Primary Examiner* — Brian D Nash
(74) *Attorney, Agent, or Firm* — Derek Fahey, Esq.; The Plus IP Firm, PLLC

(57) ABSTRACT

A bottle with a transparent window having a tubular body, a window opening along the tubular body, and a transparent panel covering the window opening. The tubular body has an outer tubular body, an outer tubular body lower end, and an outer tubular body window opening. The tubular body has an inner tubular body window opening and is positioned inside the outer tubular body that such that the inner tubular body window opening is aligned with the outer tubular body window opening. The tubular body has an upper watertight seal defined by the outer tubular body upper end being attached to the inner tubular body upper end. The tubular body also has a seal defined by an inner tubular body portion proximate to the inner window opening being attached and sealed to an outer tubular body portion proximate to the outer window opening.

11 Claims, 11 Drawing Sheets

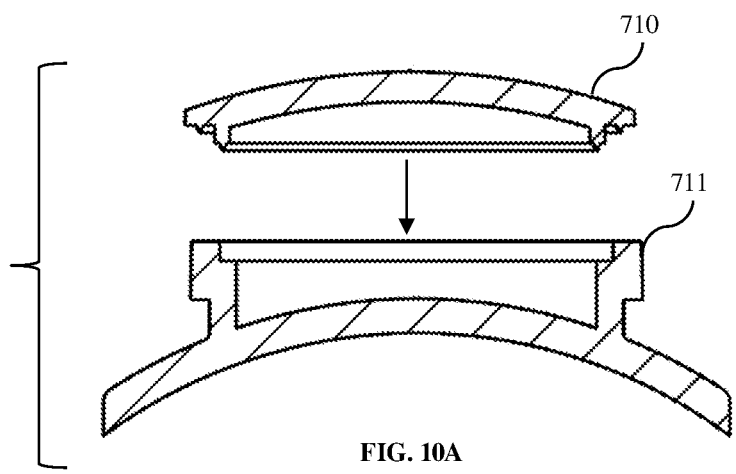
FIG. 10A
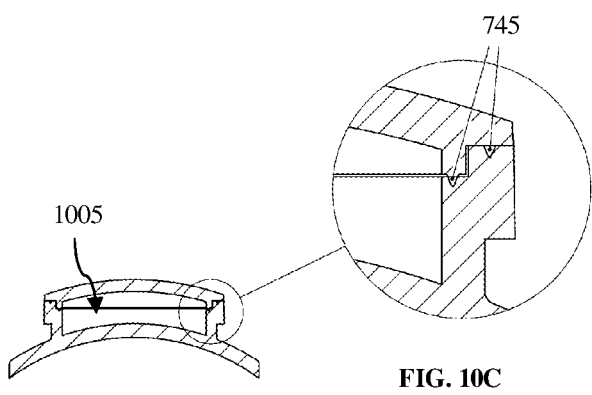
FIG. 10B
FIG. 10C

BOTTLE WITH A TRANSPARENT WINDOW

CROSS-REFERENCE TO RELATED APPLICATIONS

This application claims the benefit of priority to U.S. Provisional Application Ser. No. 63/450,444 titled "A BOTTLE WITH A TRANSPARENT WINDOW" and filed Mar. 7, 2023, the subject matter of each of which is incorporated herein by reference.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The present disclosure relates to the field of insulated bottles, and more specifically to the field of insulated bottles for drinking fluids.

BACKGROUND

The following background includes information that may be useful in understanding the present invention. It is not an admission that any of the information provided herein is prior art or relevant to the presently claimed invention, or that any publication specifically or implicitly referenced is prior art.

Drinking bottles are becoming more popular due to trend of environmental consciousness. These bottles are portable as well as portable. Consumers lean towards reusable drinking bottles to reduce the use of plastic in hopes to protect the environment. Drinking bottles can come in glass, metal, or even plastic. These drinking bottles are generally portable and easy to carry. These portable refillable bottles are widely used for water and other beverages, which are important for health and hydration. Such bottles need an indicator to inform the user for the remaining volume of the liquid. As the liquid inside these bottles continuously replenished on consumption. Sometime, the user need to consume only the prescribed quantity of the liquid.

A trending feature for drinking bottles is insulation. Insulated drinking bottles allow the liquid within the drinking bottle to maintain its temperature for a longer time period. Hot liquid remains hot and cold liquid remains cold for a longer period of time. Additionally, many consumers also prefer to view how much liquid is left in the bottle. Visibility of the liquid level in the bottle allows consumers to track dietary needs. However, insulated bottles are not transparent due to the material required to provide insulation. Insulated bottles are usually made from stainless steel or glass, which is not transparent. The non-transparency of stainless-steel bottles prevents consumers from viewing exactly how much liquid is in the bottle To solve that problem, some people use a transparent panel or some sort of apparatus that allows a user to see inside of the container. However, one of the issues with a window is that sweating occurs on the body of the container. Sweating on the container can be messy and may cause issues for the user.

As a result, there exists a need for improvements over the prior art and more particularly for a more efficient way of providing insulated fluid containers that allow for fluid visibility.

SUMMARY

A system and method for a bottle with a transparent window is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a bottle with a transparent window is disclosed. The bottle includes a novel tubular body having a tubular body closed lower end and a tubular body open upper end, a window opening along the tubular body, and a transparent panel covering the window opening allowing a visual line of sight from outside the water bottle to inside the bottle. The tubular body includes an outer tubular body having an outer tubular body upper end, an outer tubular body lower end and an outer tubular body window opening. The tubular body also includes an inner tubular body positioned inside the outer tubular body, the inner tubular body having an inner tubular body upper end, an inner tubular body lower end and an inner tubular body window opening, wherein the inner tubular body is disposed inside an outer tubular body channel of the tubular body such that the inner tubular body window opening is aligned with the outer tubular body window opening. Additionally, the tubular body includes an upper watertight seal defined by the outer tubular body upper end being attached to the inner tubular body upper end. The tubular body further includes a window opening watertight seal defined by an inner tubular body portion proximate to the inner window opening being attached to an outer tubular body portion proximate to the outer window opening. By providing an inner tubular body and an outer tubular body, it reduces sweating on the exterior of the container. Additionally, an air cavity between the inner transparent panel and outer transparent panel also decreases the amount of sweating on the exterior of the container.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the disclosure and together with the description, explain the principles of the disclosed embodiments. The embodiments illustrated herein are presently preferred, it being understood, however, that the disclosure is not limited to the precise arrangements and instrumentalities shown, wherein:

FIG. 10A illustrates an exploded top view of a cross-section of the transparent panels, according to an example embodiment.

FIG. 10B illustrates a top view of a cross-section of the transparent panels after a sonic weld, according to an example embodiment.

FIG. 10C illustrates a detailed view of a portion of the top view of the cross-section of the transparent panels after a sonic weld, according to an example embodiment.

Like reference numerals refer to like parts throughout the various views of the drawings.

DETAILED DESCRIPTION

Figure 1:
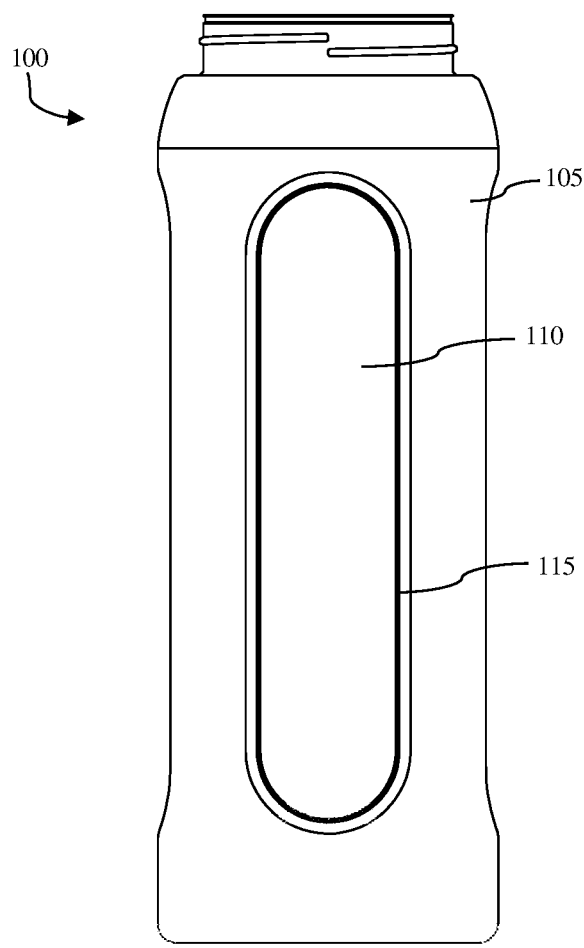
FIG. 1 illustrates a bottle with transparent window, according to an example embodiment of the present invention.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a system that provides insulation and visibility of fluid within a bottle. The bottle is configured to insulate the fluid within such that the fluid may maintain its hot or cold temperature for a longer time period. The bottle also includes a window that allows a user of the bottle to view the volume level of the fluid within the bottle. The visibility of the volume level of the fluid allows the user to know how much fluid has been consumed or to measure how much fluid to pour within the bottle such that the user may track dietary needs, such as water consumption or supplement shakes.

Referring now to the Figures, FIG. 1 illustrates a bottle 100 with transparent window. The bottle with transparent window includes a double walled vacuum jacket (105) tubular body. The tubular body having a closed lower end and a tubular body open upper end. A window opening along the tubular body and a transparent panel (110) covering the window opening along the window bezel (115), allowing a visual line of sight from outside the bottle to inside the bottle.

In another embodiment, the tubular body of the bottle includes an outer tubular body having an outer tubular body upper end, an outer tubular body lower end and an outer tubular body window opening; an inner tubular body positioned inside the outer tubular body, the inner tubular body having an inner tubular body upper end, an inner tubular body lower end and an inner tubular body window opening; and wherein the inner tubular body is disposed welded inside an outer tubular body channel of the tubular body such that the inner tubular body window opening (220) is welded and aligned with the outer tubular body window opening. An upper water tight seal is defined by the outer tubular body upper end being attached to the inner tubular body upper end; and a window opening seal defined by an inner tubular body portion proximate to the inner window opening being attached and sealed with to an outer tubular body portion proximate to the outer window opening.

Figure 2:
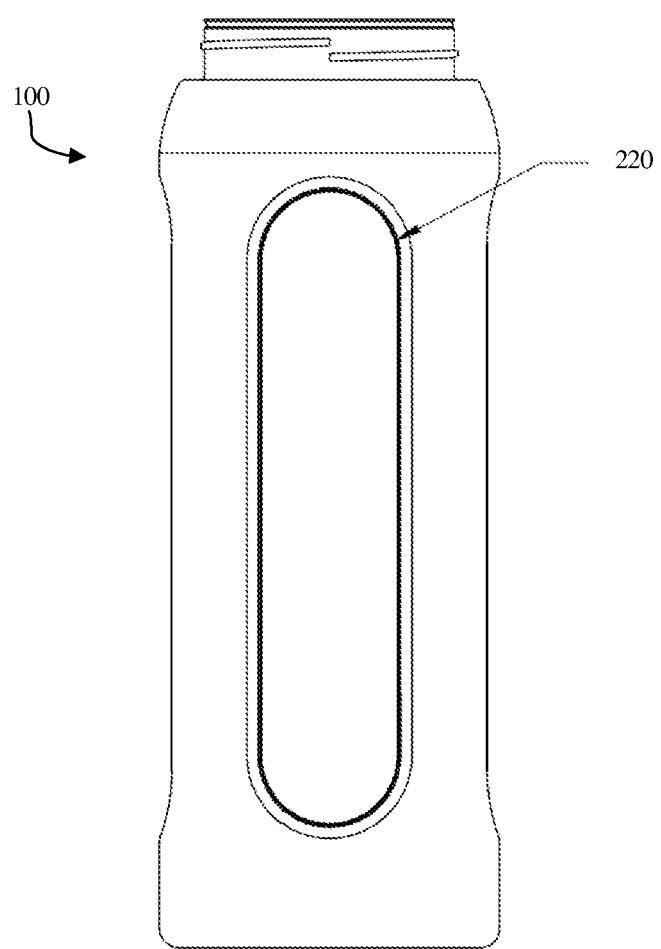
FIG. 2 illustrates inner and outer steel tubular bodies of a bottle with transparent window, according to an example embodiment of the present invention.
Figure 3:
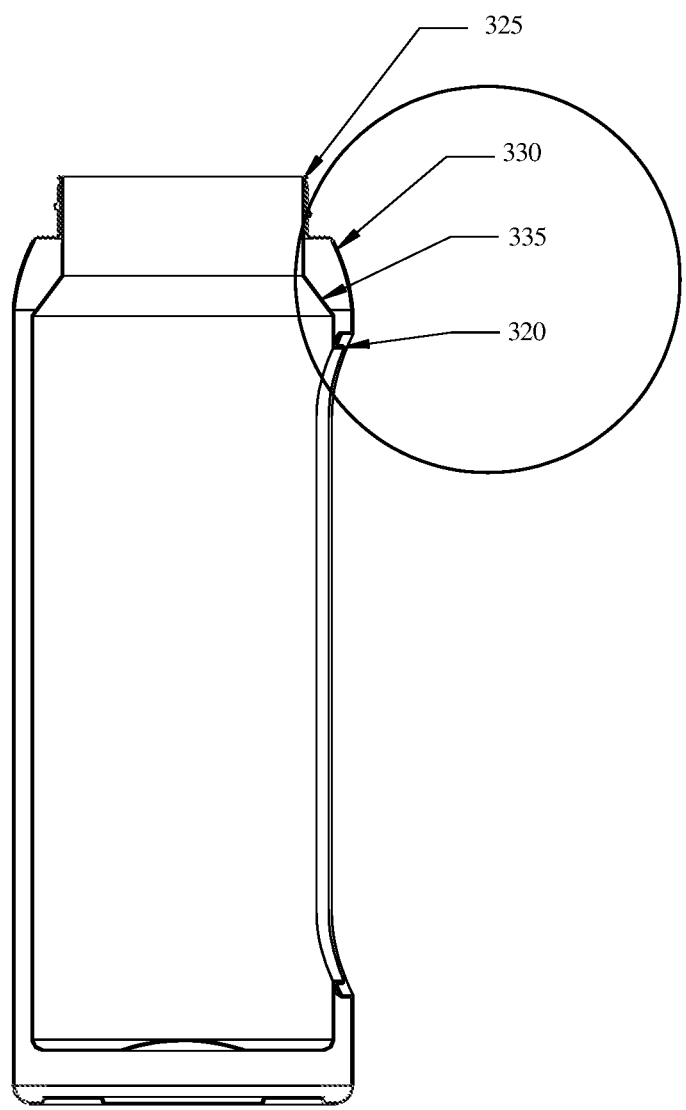
FIG. 3 illustrates a side cross-sectional view of a welded inner tubular body and outer tubular body of a bottle with transparent window, according to an example embodiment of the present invention.

FIG. 2 illustrates inner tubular body and outer steel tubular body of a bottle with transparent window, according to an embodiment of the present invention. FIG. 2 further illustrates the bottle with the window (220) having the transparent panels attached thereto. FIG. 3 illustrates the sectional view of welded inner and outer tubular body of a bottle with transparent window. FIG. 3 further illustrates outer tubular body (330), inner tubular body (335), welded window opening (320) and welded top opening (325).

Figure 4:
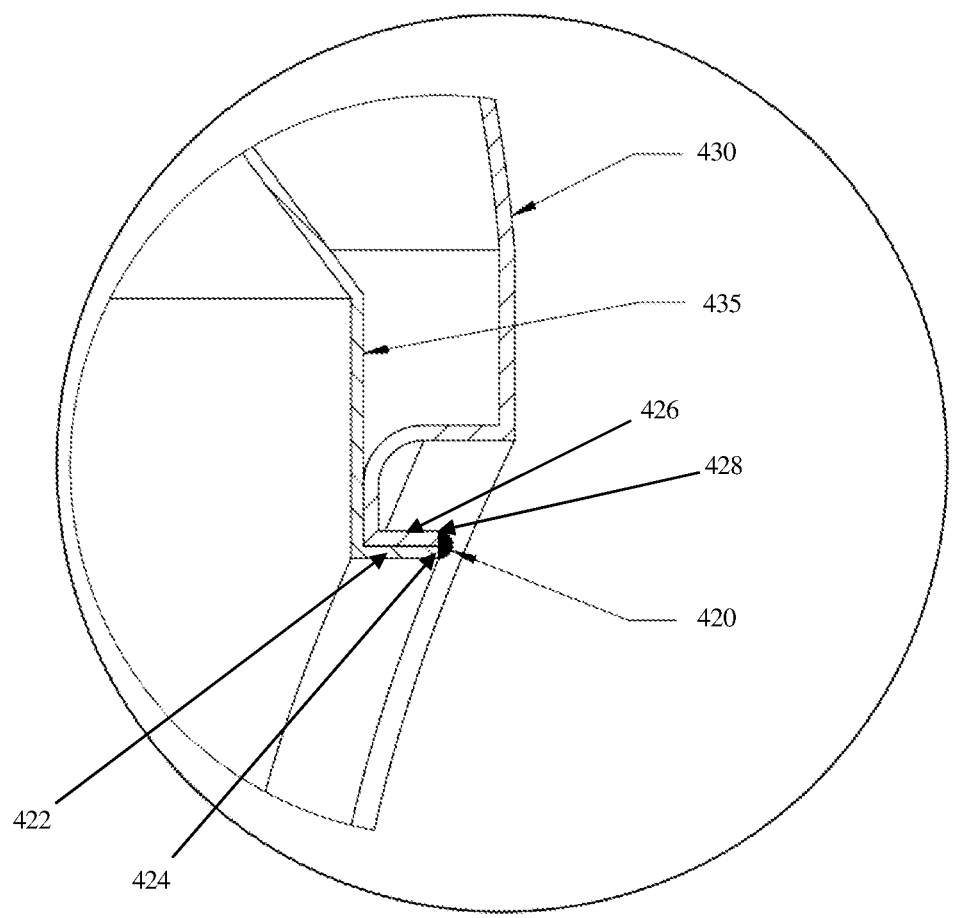
FIG. 4 illustrates a detailed view of a portion of a window weld between inner tubular body and outer tubular body of the bottle with transparent window, according to an example embodiment of the present invention.

FIG. 4 illustrates the detailed view of the joint, connection or window weld (420) between inner tubular body (435) and outer tubular body (430) of a bottle with transparent window, where the window opening weld (420) is between outer tubular body and inner tubular body according to an example embodiment. The weld may be a sonic weld. Glue or other fascinating means may also be used additionally, or alternatively, to join the inner tubular body in outer tubular body. However, other means of sealing the connection point between the inner tubular body and outer tubular body may be used and are within the spirit and scope of the present invention.

Figure 5:
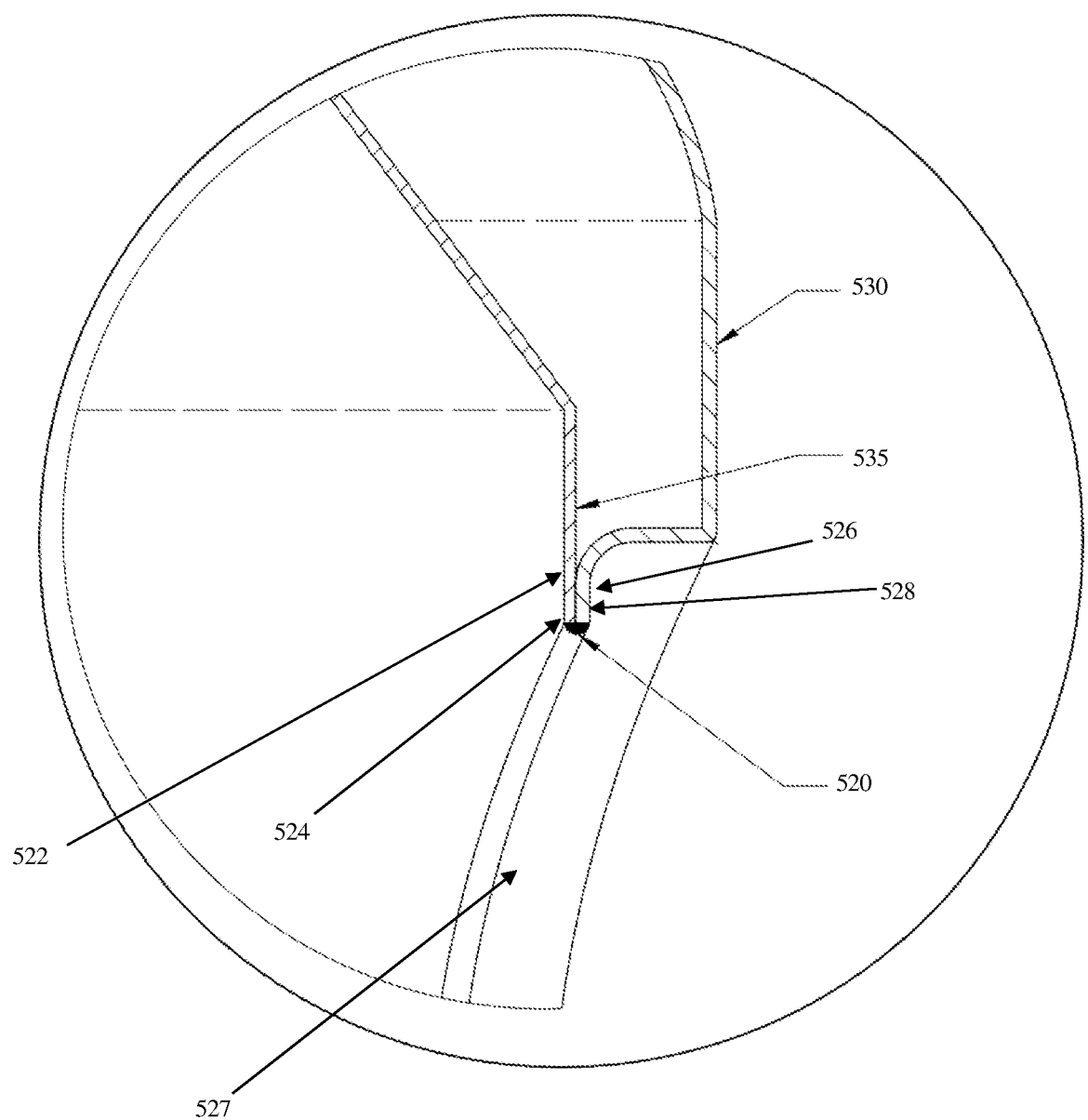
FIG. 5 illustrates a detailed view of alternate of a portion of a window weld between inner and outer tubular body of a bottle with transparent window, according to an example embodiment of the present invention.

FIG. 5 illustrates the detailed view of another example embodiment of the window seal between inner and outer tubular body of a bottle with transparent window. The FIG. 5 further illustrates an outer tubular body (530), inner tubular body (535) and connection point, weld or seal (520) of the first tubular body and second tubular body near the window opening. The bottle includes an upper watertight seal, which is formed by welding the outer tubular body upper end to the inner tubular body upper end. A window opening seal (520) is formed by welding the inner tubular body portion proximate to the inner window opening to the outer tubular body portion proximate to the outer window opening. The weld may be a sonic weld. Glue or other fascinating means may also be used additionally, or alternatively, to join the inner tubular body in outer tubular body. However, other means of sealing the connection point between the inner tubular body and outer tubular body may be used and are within the spirit and scope of the present invention.

FIG. 4 is one embodiment of the window opening seal (420) that may be used to join the outer tubular body and inner tubular body. The window opening seal (420) further includes a first lip (422) that extends outward from the inner tubular body (435). The first lip has a first lip terminating end (424). A second lip (426) extends from the outer tubular body (430) and has a second lip terminating end (428). The first lip terminating end (424) is proximate to the second lip terminating end (428). The first lip terminating end is attached to and sealed with the second lip terminating end. The seal may be in form of a sonic weld, or glue or both. In other embodiments, other sealing means may be used and are within the spirit and scope of the present invention.

FIG. 5 is one embodiment of the window opening seal (420) that may be used to join the outer tubular body and inner tubular body. FIG. 5 illustrates the window opening seal (520) that includes a first lip (522) that extends inward from the inner tubular body (535) toward a center (527) of the window opening. The first lip has a first terminating end (524). A second lip (526) extends inward from the outer tubular body (530) toward the center (527) of the window opening. The second lip has a second terminating end (528). The first terminating end (524) of the first lip is positioned proximate to the second terminating end (528) of the second lip. The first terminating end of the first lip is attached to and sealed with the second terminating end of the second lip. The seal may be in form of a sonic weld, or glue or both. In other embodiments, other sealing means may be used and are within the spirit and scope of the present invention.

Figure 6:
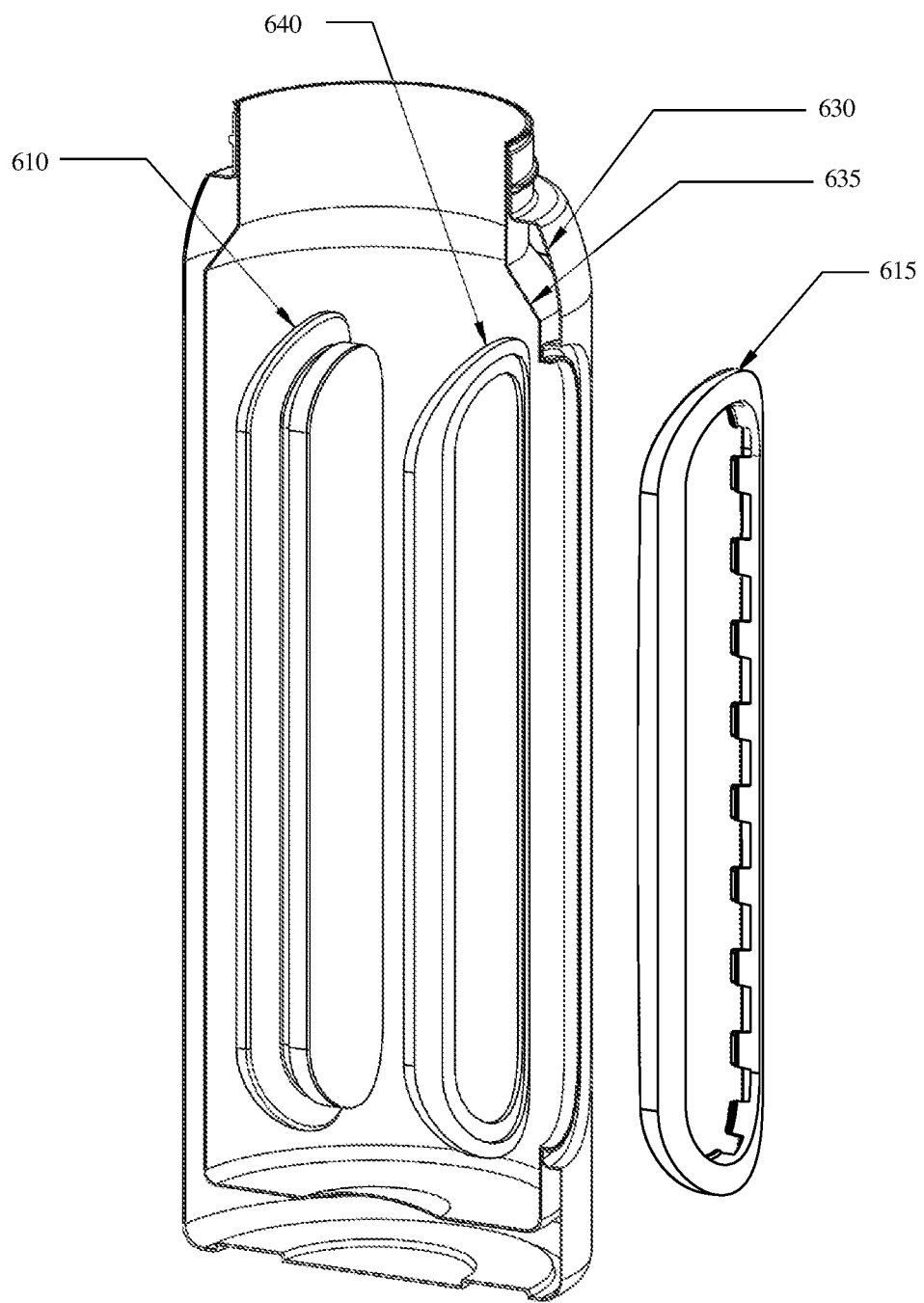
FIG. 6 illustrates an exploded view of window assembly of a bottle with transparent window, according to an example embodiment of the present invention.

FIG. 6 is an exploded view that illustrates the sectional cutout of window assembly of a bottle with transparent panel (610). FIG. 6 illustrates that the inner tubular body (635) is positioned with the outer tubular body (630). An O-shaped ring seal (640) and bezel (615) is used to seal the transparent panel (610) to the window opening of the inner tubular body and outer tubular body. The seal may be further created using glue or a sonic weld to further create a watertight seal. This sealing mechanism is integral to ensuring the hermetic integrity of the air cavity formed between these panels, contributing significantly to the bottle's insulation properties and overall durability. A ring seal refers to a continuous, circular sealing element that encircles the perimeter where the two transparent panels meet. Its primary function is to create an airtight and possibly watertight seal, preventing the ingress of moisture, air, and contaminants into the air cavity between the panels. This seal is crucial for maintaining the insulative properties of the air cavity and protecting the visual clarity of the transparent panels. The ring seal is specifically configured to match the contours of the panels' edges, ensuring a precise fit that maximizes sealing effectiveness. It can be made from a variety of materials, such as silicone, rubber, or other flexible, durable polymers that offer excellent sealing properties and are compatible with the materials of the transparent panels. The choice of material is determined by considerations such as the seal's resistance to temperature variations, chemical exposure, and physical wear and tear, ensuring long-term performance without degradation. The ring seal plays a critical role in enhancing the structural integrity and functional performance of the window feature. By securing the air cavity against external influences, the seal contributes to the bottle's ability to maintain the temperature of its contents for extended periods. Furthermore, the ring seal aids in protecting the edges of the transparent panels from mechanical damage, thereby extending the lifespan of the bottle and preserving its aesthetic appeal.

The bottle includes a bezel (615) that surrounds a wall of the transparent panel such that the bezel provides a friction fit between the bezel and the transparent panel. The shape of the bezel may be changed depending on the type of use. The bezel is a frame or band that holds the transparent panel in place. This bezel is designed to encircle the perimeter of the transparent panel's wall, which is the edge or boundary of the panel. The primary function of the bezel is to secure the panel within the bottle's structure, preventing movement and creating a stable viewing window. The design of the bezel for this bottle involves a construction that allows it to exert pressure on the edges of the transparent panel, creating a friction fit. This means the bezel is configured to have a slightly smaller or precisely matching contour compared to the wall of the transparent panel it surrounds. When the bezel is placed around the panel, the inherent tension creates a snug fit, holding the panel firmly in place without the need for additional adhesives or fasteners.

Figure 7:
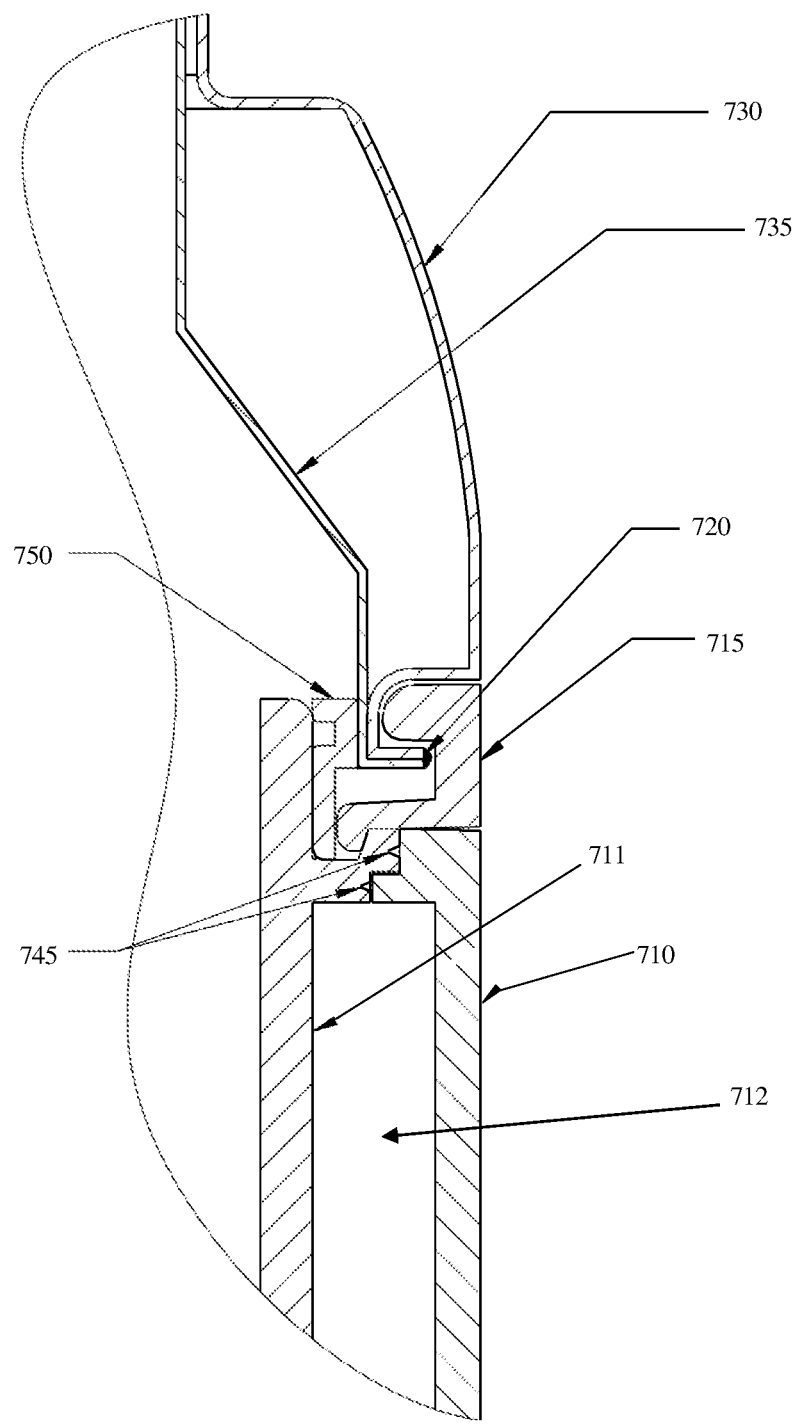
FIG. 7 illustrates a detailed view of seal between window, gasket and window bezel of a bottle with transparent window, according to an example embodiment of the present invention.

FIG. 7 illustrates the detailed view of seal between windows, gasket and window bezel of a bottle with transparent window. The bottle includes at least one of glue and a weld attaches the first transparent panel to the second transparent panel. FIG. 7 further illustrates an outer tubular body (730), inner tubular body (735), window bezel (715), transparent panels (710)(711), window weld between inner and outer tubular body (720), sealing gasket or ring seal (750) and sonic weld or glue (745) between transparent window panels (710)(711). The bottle includes an O-ring or ring seal (750), which further seals the transparent panel and the second transparent panel. The bottle includes a second transparent panel (711) is attached inward relative to the outward transparent panel (710) defining an air cavity (712) between the transparent panel and second transparent panel. The transparent window assembly includes an O-ring inserted into the groove on the transparent window. The O-ring inserted into the bottle through the mouth of the bottle. The O-ring is pressed into the window opening through the mouth of the bottle. The window bezel is pressed onto the transparent window from the outside of the bottle. The window bezel held in place by snap-fit or screw fastener to the transparent window.

Figure 8:
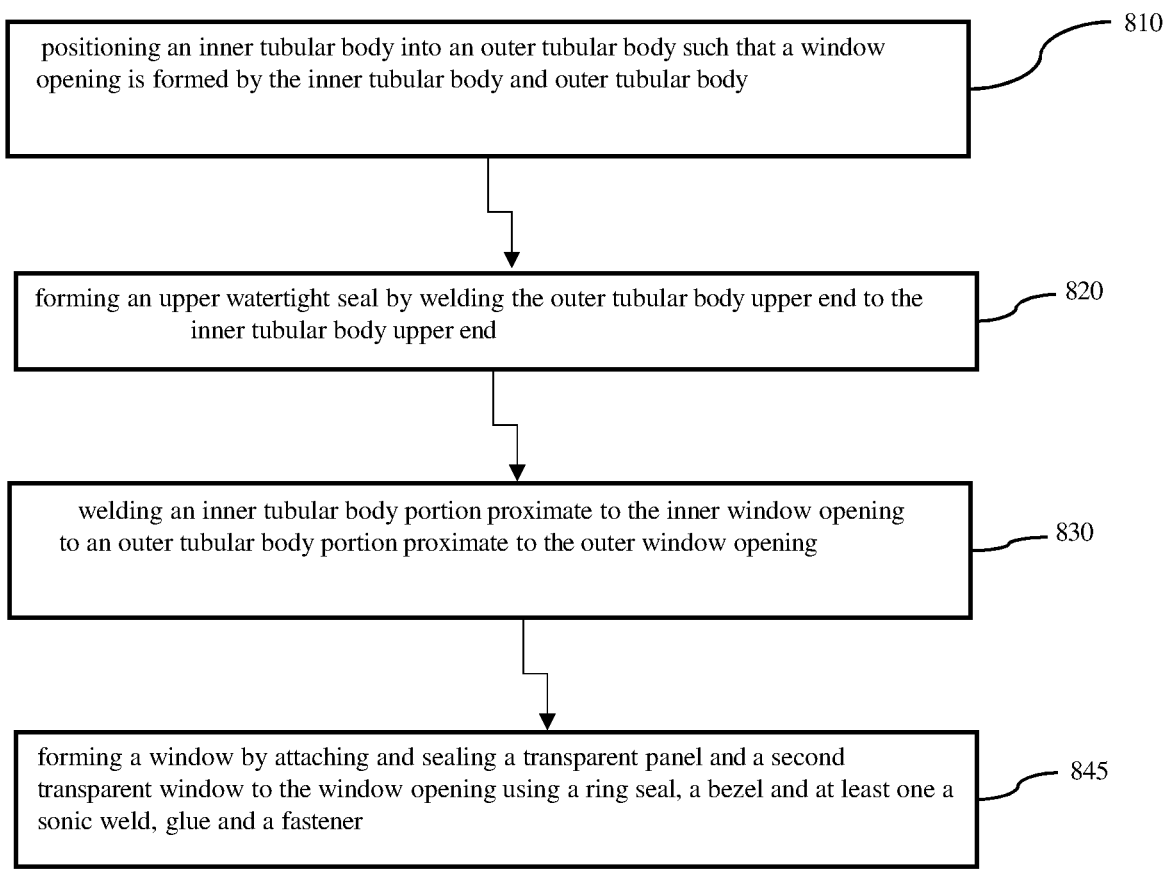
FIG. 8 illustrates the flow chart of method of manufacturing a bottle with transparent window, according to an example embodiment of the present invention.
Figure 9:
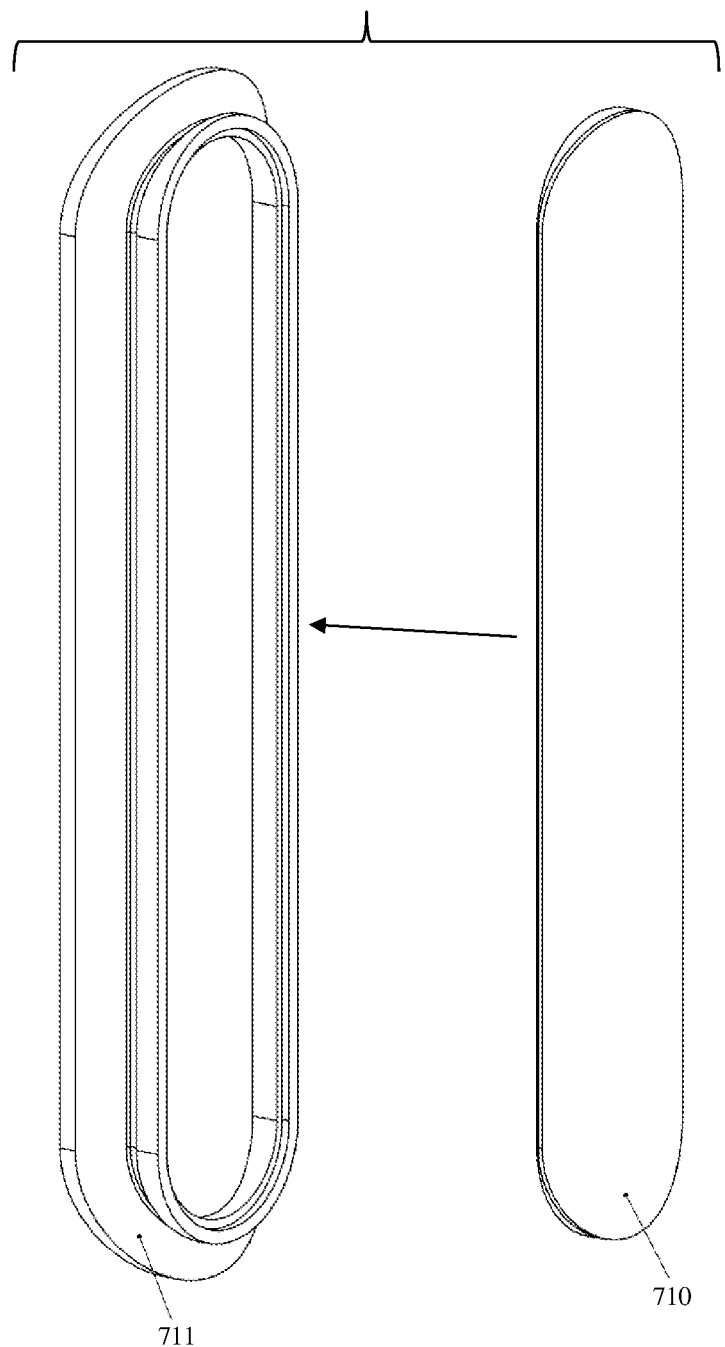
FIG. 9 illustrates a perspective view of the transparent panels, according to an example embodiment.

FIG. 8 illustrates a method of manufacturing a bottle with transparent window includes the steps of positioning an inner tubular body into an outer tubular body such that a window opening is formed by the inner tubular body and outer tubular body. First, in step 810, an inner tubular body is positioned into an outer tubular body such that a window opening is formed by the inner tubular body and outer tubular body. In one embodiment, oval shaped openings are formed through inner and outer tubular bodies separately by laser cutting however other embodiments may be used and are within the spirit and scope of the present invention. Next, in step 820, an upper watertight seal is formed by welding the outer tubular body upper end to the inner tubular body upper end. The upper tight water seal may be formed by a laser weld, however other means of forming a watertight seal may be used (Such as glue, stapling, friction fits, seals etc.) and are within the spirit and scope of the present invention.

Next, in step 830, an inner tubular body portion proximate to the inner window opening is welded to an outer tubular body portion proximate to the outer window opening. The seal may be formed by a laser weld, however other means of forming a watertight seal may be used (Such as glue, stapling, friction fits, seals etc.) and are within the spirit and scope of the present invention.

Next, in step 845, a window is formed by attaching and sealing a transparent panel and a second transparent window to the window opening using a ring seal, a bezel and at least one a sonic weld, glue and a fastener. However other types of fasteners or seals may be used within the spirit and scope of the present invention. Lips in inner and outer tubular body are made separately by male and female dies. Grind and weld tubular bodies together at mouth of the bottle. Grind and weld mating window lips together forming a vacuum seal.

The tubular bodies may be made of materials such as carbon steel, stainless steel, aluminum, Titanium, other metals or alloys. However, other materials bay be used that are within the spirit and scope of the present invention. Each tubular body may be formed from a single piece or from several individual pieces joined or coupled together. The components of the each tubular body may be manufactured from a variety of different processes including via a CNC lathe, extrusion, a mold, welding, shearing, punching welding, folding etc.

The size of the air cavity (712) may be adjusted depending on the size of the bottle. Additionally, the air cavity may be filled with fluid or gas to improve the functionality of the air cavity and for preventing sweating on the outside of the bottle. Additionally, the air cavity may be adjusted for aesthetic purposes. Additionally, the specific shape of the lips allows there to be a double shell and a double transparent window with the air cavity which also prevents sweating and leaking of fluid that is held within the container.

Figures 11A, 11B:
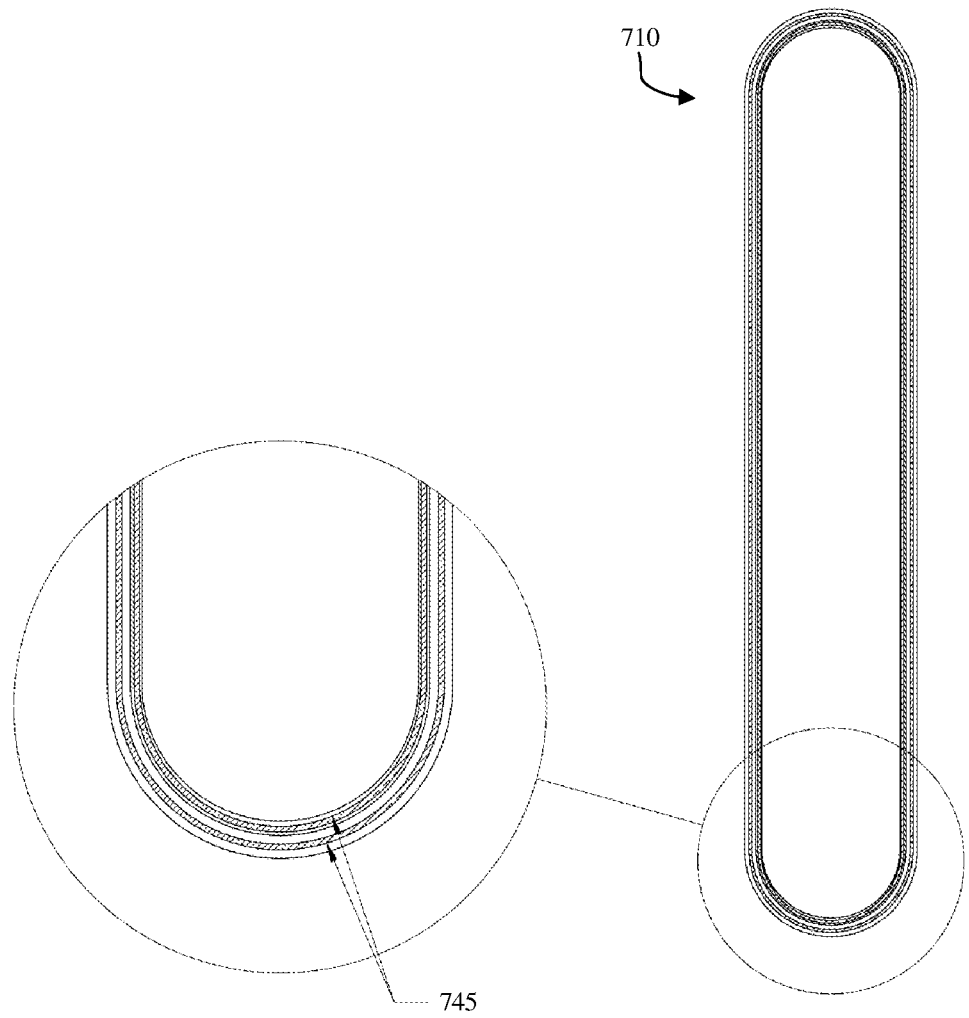
FIG. 11A illustrates a front view of a cross-section of the transparent panel, according to an example embodiment.
FIG. 11B illustrates a detailed view of a portion of the front view of the cross-section of the transparent panel from FIG. 11A, according to an example embodiment.

Referring now to FIGS. 9 through 11B, FIG. 9 illustrates a perspective view of the transparent panels (710, 711), according to an example embodiment. FIG. 10A illustrates an exploded top view of a cross-section of the transparent panels, according to an example embodiment. FIG. 10B illustrates a top view of a cross-section of the transparent panels after a sonic weld, according to an example embodiment. FIG. 10C illustrates a portion of the top view of the cross-section of the transparent panels after a sonic weld, according to an example embodiment. FIG. 11A illustrates a front view of a cross-section of the transparent panel, according to an example embodiment. FIG. 11B illustrates a portion of the front view of the cross-section of the transparent panel from FIG. 11A, according to an example embodiment.

The second transparent panel (711) is attached inward relative to the transparent panel (710) defining an air cavity (1005) between the transparent panel and the second transparent panel. The attachment of a second transparent panel inward relative to the transparent panel, specifically engineered to define an air cavity between these two panels. This feature enhances the functionality and aesthetic value of the bottle, offering improved insulation properties and a distinct visual effect. The second transparent panel serves as an additional layer of material positioned parallel to and spaced apart from the primary transparent panel. The key purpose of this arrangement is to create an air cavity between the two panels. This air cavity acts as an insulating barrier, reducing heat transfer between the interior of the bottle and the external environment. It also contributes to the structural integrity of the window feature, adding depth and enhancing the visual appeal of the bottle. The second transparent panel is designed with specific dimensions and material properties to complement the primary panel, ensuring that when attached inwardly, it aligns perfectly to form a uniform and sealed air cavity. The spacing between the two panels is precisely calculated to optimize the insulating effect while maintaining the bottle's sleek profile. This arrangement not only enhances the thermal insulation properties of the bottle but also serves to protect the integrity of the window opening by providing additional strength and resistance to impacts. The air cavity acts as a thermal barrier, significantly improving the bottle's ability to maintain the temperature of its contents, whether hot or cold. This feature is particularly valuable for users who require long-term temperature retention without the bulkiness associated with traditional insulating materials. Additionally, the dual-panel design contributes to the bottle's aesthetic appeal, offering a unique visual depth to the window opening that can enhance the visibility of the contents or create interesting optical effects.

At least one of glue and a weld attaches the transparent panel to the second transparent panel. The use of glue as an adhesive involves selecting a substance that is clear, durable, and compatible with the materials of both transparent panels to prevent any visual distortion or weakening of the bond over time. Adhesives suitable for this purpose may include epoxy resins, UV-curing adhesives, or cyanoacrylates, each chosen based on their bonding strength, clarity, and resistance to environmental factors such as temperature changes and moisture. Welding, on the other hand, may involve processes like ultrasonic welding or laser welding, which are capable of joining transparent materials without the need for an intermediary substance. This method requires precise control over the welding parameters to ensure a clean, clear bond that does not compromise the transparency or structural integrity of the panels. A secure bond ensures that the air cavity between the panels is maintained, preserving the insulative properties of the design. Moreover, a clear and strong bond is essential for maintaining the visual appeal of the transparent window, ensuring that the contents of the bottle are visible without distortion or obstruction.

In the present embodiment, the bottle includes a sonic weld that creates energy directors on the inside face of the transparent panel (710). Sonic welding, or ultrasonic welding, is a process that uses high-frequency ultrasonic acoustic vibrations to create a solid-state weld between two materials without melting them. This technique is particularly suited for plastic materials, making it an excellent choice for bonding transparent panels in the bottle design. Energy directors are specially designed features on one or more of the surfaces to be welded, typically in the form of small protrusions or ridges. These directors focus the ultrasonic energy to initiate the welding process, ensuring a precise and localized bond. Energy directors are positioned on the perimeter of the inside face of the primary transparent panel. These directors are geometrically shaped to concentrate the ultrasonic energy at the interface between the two panels. When sonic welding is applied, the vibrations cause the energy directors to melt first, creating a localized heat that quickly bonds the primary panel to the second panel. This method allows for a controlled, clean weld that does not compromise the transparency or integrity of the panels. This welding technique ensures a strong bond that is critical for maintaining the air cavity's integrity and the insulative properties of the bottle. Additionally, because the weld is localized and does not require the entire panel to be heated, it preserves the material properties of the transparent panels, ensuring that they remain clear and free from distortion or warping. This approach allows for a stronger, more reliable bond with minimal risk of aesthetic or structural defects. The precise control offered by sonic welding ensures that the panels are bonded without excessive heat exposure, preserving the clarity and integrity of the transparent materials. Furthermore, this method simplifies the assembly process, reducing manufacturing time and costs while enhancing the durability and performance of the finished product. The use of energy directors for focused energy application exemplifies an innovative approach to material bonding, showcasing the inventive aspects of this bottle design.

The sonic weld portions (745) on the inside face of the transparent panel are offset relative to a single plane. This configuration involves arranging the areas or points where ultrasonic welding is applied in a manner that they do not all lie flat on the same geometric plane. Instead, they are staggered or positioned at varying distances from a reference plane, creating a multi-level surface topology. The offset configuration of sonic weld portion creates two concentric rings of energy directors proximate to the perimeter of the inside face of the transparent panel. Each of the concentric rings (745) may be a ring seal created sonic. Additionally, in other embodiments where other sealing elements are used, such as by adhesive, then each of the concentric and offset ring will be formed from that sealing means (such as adhesive). The concept of offsetting elements relative to a single plane involves creating a surface where specific features are intentionally raised or lowered relative to a common baseline. This technique is used to modify the physical interaction between two components being joined, such as the transparent panels in this bottle design. When applied to sonic weld portions, it means that the locations designated for ultrasonic welding are not all positioned at the same height or depth but are instead varied systematically across the surface. Being offset relative to a single plane means that the energy directors or targeted welding areas are designed with a deliberate variation in their positioning. This might involve alternating the height of energy directors or creating a pattern where some weld points are slightly elevated or recessed compared to others. The purpose of this variation is to ensure a more effective energy concentration and distribution during the ultrasonic welding process, leading to a stronger and more uniform bond across the interface between the two panels.

The offset arrangement of sonic weld portions enhances the structural integrity and functionality of the window feature. By optimizing the distribution of ultrasonic energy, this design ensures that the welding process achieves a consistent bond throughout the joining surface, minimizing areas of weakness or potential failure. This contributes to the durability of the seal and maintains the insulative properties of the air cavity formed between the panels. Additionally, this approach can improve the aesthetic quality of the weld by avoiding distortions or inconsistencies in the visible parts of the panel. The use of offset sonic weld portions enhances the quality and reliability of ultrasonic welding in transparent panel applications. This method improves over traditional, flat-plane welding by creating a more effective bond, reducing the risk of failure, and enhancing the visual and functional integrity of the product.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:
1. A bottle system comprising:
a tubular body having a tubular body closed lower end and a tubular body open upper end;
a window opening along the tubular body; and
a transparent panel covering the window opening allowing a visual line of sight from outside the bottle to inside the bottle;
wherein the tubular body comprises:
an outer tubular body having an outer tubular body upper end, an outer tubular body lower end and an outer tubular body window opening;
an inner tubular body positioned inside the outer tubular body, an inner tubular body having an inner tubular body upper end, an inner tubular body lower end and an inner tubular body window opening;
wherein the inner tubular body is disposed inside an outer tubular body channel of the tubular body such that the inner tubular body window opening is aligned with the outer tubular body window opening; and;
an upper water tight seal defined by the outer tubular body upper end being attached to the inner tubular body upper end; and
a window opening seal defined by an inner tubular body portion proximate to an inner window opening being attached and sealed with to an outer tubular body portion proximate to an outer window opening;
wherein the upper water tight seal is formed by welding the outer tubular body upper end to the inner tubular body upper end.

2. The bottle system of claim 1, wherein the window opening seal is formed by welding the inner tubular body portion proximate to the inner window opening to the outer tubular body portion proximate to the outer window opening.

3. The bottle system of claim 2, wherein the window opening seal further comprises:
a first lip that extends outward from the inner tubular body, the first lip having an first lip terminating end;
a second lip extending from the outer tubular body and having a second lip terminating end;
wherein the first lip terminating end is proximate to the second lip terminating end; and
wherein the first lip terminating end is attached to and sealed with the second lip terminating end.

4. The bottle system of claim 3, wherein a bezel surrounds a wall of the transparent panel such that the bezel providing a friction fit between the bezel and the transparent panel.

5. The bottle system of claim 4, wherein a second transparent panel is attached inward relative to the transparent panel defining an air cavity between the transparent panel and the second transparent panel.

6. The bottle system of claim 5, wherein at least one of glue and a weld attaches the transparent panel to the second transparent panel.

7. The bottle system of claim 6, wherein a ring seal further seals the transparent panel and the second transparent panel.

8. The bottle system of claim 7, wherein the ring seal further comprising a first ring shaped seal that is concentric and offset from a second ring shaped seal.

9. A method of manufacturing a water comprising:
positioning an inner tubular body into an outer tubular body such that a window opening is formed by the inner tubular body and outer tubular body;
wherein the inner tubular body has an inner tubular body upper end, an inner tubular body lower end and an inner tubular body window opening; and wherein the outer tubular body has an outer tubular body upper end, an outer tubular body lower end and an outer tubular body window opening;

forming an upper watertight seal by welding the outer tubular body upper end to the inner tubular body upper end;

welding an inner tubular body portion proximate to the inner tubular body window opening to an outer tubular body portion proximate to the outer tubular body window opening; and forming a window by attaching and sealing a transparent panel and a second transparent window to the window opening using a ring seal, a bezel and at least one a sonic weld, glue and a fastener.

10. The method of claim 9, wherein the ring seal further comprising a first ring shaped seal that is concentric and offset from a second ring shaped seal.

11. A bottle system comprising:

a tubular body having a tubular body closed lower end and a tubular body open upper end;

a window opening along the tubular body; and a transparent panel covering the window opening allowing a visual line of sight from outside the bottle to inside the bottle;

a window opening seal comprising:

a first lip that extends inward from an inner tubular body toward a center of the window opening, the first lip having a first terminating end;

a second lip that extends inward from an outer tubular body toward the center of the window opening, the second lip having a second terminating end;

wherein the first terminating end of the first lip is positioned proximate to the second terminating end of the second lip; and wherein the first terminating end of the first lip is attached to and sealed with the second terminating end of the second lip.

\* \* \* \* \*